United States Patent

Mosley

Patent Number: 5,583,674
Date of Patent: Dec. 10, 1996

[54] MULTILAYERED DISPLAY HAVING TWO DISPLAYS IN SERIES AND A SWITCHABLE OPTICAL RETARDER

[75] Inventor: Alan Mosley, Berkhamsted, England

[73] Assignee: GEC-Marconi Ltd., Middlesex, United Kingdom

[21] Appl. No.: 608,095

[22] Filed: Feb. 28, 1996

Related U.S. Application Data

[63] Continuation of Ser. No. 291,592, Aug. 15, 1994, abandoned.

[30] Foreign Application Priority Data

Aug. 14, 1993 [GB] United Kingdom ............... 931691

[51] Int. Cl.$^6$ .................. G02F 1/1347; G02F 1/1335
[52] U.S. Cl. ................... 349/77; 349/74; 349/117; 349/100
[58] Field of Search .................. 359/53, 41, 48, 359/73, 63

[56] References Cited

U.S. PATENT DOCUMENTS

| | | | |
|---|---|---|---|
| 4,017,156 | 4/1977 | Moriyama et al. | 359/53 |
| 4,924,215 | 5/1990 | Nelson et al. | 359/48 |
| 5,097,352 | 3/1992 | Takahashi et al. | 359/41 |
| 5,175,637 | 12/1992 | Jones et al. | 359/48 |
| 5,200,844 | 4/1993 | Suvada | 359/40 |
| 5,231,521 | 7/1993 | Johnson et al. | 359/53 |
| 5,243,455 | 9/1993 | Johnson et al. | 359/53 |
| 5,299,038 | 3/1994 | Hamada et al. | 359/50 |
| 5,341,231 | 8/1994 | Yamamoto et al. | 359/69 |
| 5,371,618 | 12/1994 | Tai et al. | 359/53 |
| 5,373,380 | 12/1994 | Harada et al. | 359/75 |
| 5,381,253 | 1/1995 | Sharp et al. | 359/55 |

FOREIGN PATENT DOCUMENTS

| | | |
|---|---|---|
| 0541128 | 5/1993 | European Pat. Off. |
| 258996B1 | 6/1993 | European Pat. Off. |
| 58-199321 | 11/1983 | Japan ......................... 359/53 |
| 1470475 | 4/1977 | United Kingdom . |
| 1499453 | 2/1978 | United Kingdom . |
| 2211010 | 6/1989 | United Kingdom . |
| WO89/03059A2 | 4/1989 | WIPO . |

OTHER PUBLICATIONS

Scheffer et al, Twisted Nematic & Supertwisted Nematic Mode LCDs, Chapter 10, p. 251.
Japanese Journal Of Applied Physics, vol. 24, 1985 Tokyo JP pp. L626–L628, S. Sato et al.: "Variable–Focus Liquid–Crystal Fresnel Lens".

Primary Examiner—Anita Pellman Gross
Assistant Examiner—Toan Ton
Attorney, Agent, or Firm—Donald C. Casey

[57] ABSTRACT

A display arrangement comprises an image intensifier tube or some other device which provides a representation of a viewed scene at an input. A supertwist LCD and associated polarizers and are located between the input and a viewer. A ferroelectric liquid crystal shutter is located between the LCD and second polarizer and is controlled to produce symbology. By switching the shutter the polarization of the incident radiation is switched between two states differing by 90°. This causes the LCD to operate in two states. In one state the viewed scene is transmitted through the LCD and in the other state it is absorbed and any symbology on the LCD is contrasted with a dark absorbing background. The shutter is switched sufficiently quickly that the viewer perceives the symbology overlaid on the viewed scene. In another arrangement, lens means having focusing properties which are dependent on the incident polarization is included to allow switching between different display modes.

24 Claims, 2 Drawing Sheets

MULTILAYERED DISPLAY HAVING TWO DISPLAYS IN SERIES AND A SWITCHABLE OPTICAL RETARDER

This application is a continuation of application Ser. No. 08/291,592 filed Aug. 15, 1994 now aband.

FIELD OF THE INVENTION

This invention relates to display arrangement and more particularly, but no exclusively, to arrangements including liquid crystal devices for presenting symbology or other imagery overlaid on a viewed scene.

BACKGROUND OF THE INVENTION

In many applications, it is desirable to be able to provide a viewer of a scene with additional visual information. For example, an aircraft pilot may be equipped with goggles which permit direct viewing of a scene while superimposing data, for example concerning airspeed, altitude and so on, from a display using a suitable arrangement of prisms and other optical components to conduct it to the focal plane. In other arrangements, the scene may be viewed via an image intensifier, for example, which may convert infra-red radiation into the visible part of the spectrum and intensify low level visible radiation. It may also be advantageous to provide additional symbology overlaid on an intensified image of the scene.

The present invention is applicable to both applications in which a scene is viewed directly by an observer, with or without enhancements provided by an optical assembly, and for those in which the viewed scene is representative of the actual scene and has been subjected to processing by an image intensifier tube or some other device.

SUMMARY OF THE INVENTION

According to the invention there is provided a display arrangement comprising a display assembly including a first liquid crystal display and a second display located behind the first and means for changing the polarisation of light transmitted through the said means whereby the assembly display mode is changed.

The first display is nearest the viewer and the second display is located to the rear, behind it.

The means for changing the polarisation of light in an arrangement in accordance with the invention may be capable of operating an relatively high switching speeds, enabling switching between display modes to be achieved at a higher rate than would be possible if the displays themselves were modified to change the mode of the assembly. The invention is particularly applicable to arrangements in which the second display is a viewed scene presented at an input of the arrangement. The first display may be arranged to display symbolic information. By switching the polarisation between two states the symbology may appear overlaid on the viewed scene. In other arrangements, the second display could be a liquid crystal display, for example.

In one advantageous embodiment of the invention, the arrangement is such that, by switching the means for changing the polarisation of light between two states, the first display switches between a first mode in which the display background is substantially optically transmissive and a second mode in which it is substantially optically absorbing. When the device is in the first mode, symbology generated on the liquid crystal by addressing particular regions appears dark, and the scene (second display) beyond the first display is observable by a viewer. The scene may be a display produced by the output of an image intensifier tube or could be an unaided view of the scene. In the second mode, in which the background of the first display appears dark and the symbology light, any radiation emitted from the viewed scene either directly or via an intervening optical converter of some type, is absorbed by the first display except for those regions which have been addressed to provide the symbology. The first display is temporarily illuminated with an external light source during the second mode. By switching between the two modes, the viewer perceives the symbology overlaying the scene. As the response time of the eye is approximately 20 ms the means for controlling the polarisation must be switched between the two states at a rate such that each mode persists for 10 ms or less for good results. In one preferred embodiment of the invention, the means for controlling the polarisation is a ferroelectric liquid crystal cell. Such a shutter can switch between its first and second states in typically 100 to 200 microseconds. Thus the successful merging of the two images may be readily carried out.

The liquid crystal display response time is typically in the region of 20 ms or greater for twisted nematic type image displays and is typically between 80 and 150 ms for those based on supertwist LCDs. However, by employing the invention, this slow response rate is not an impediment to providing a display arrangement in which additional symbology is overlaid on an image of a viewed scene.

In another advantageous embodiment of the invention, the display assembly includes lens means having a focal length which is dependent on the polarisation of incident light and arranged between the means for changing the polarisation and an exit polariser. Thus, by switching the polarisation between two states, the focal length may also be changed to give two different focal characteristics. For example, the lens means may be such that it switches between focusing and non-focusing states. By arranging that the first display is within the focal plane when it is in its focusing state, the two displays can be imaged alternately and will appear to an observer to merge if switching is carried at a sufficiently high rate. The lens means is preferably a liquid crystal display. A suitable device is disclosed in our patent specification number EP(UK) 0258996B. The lens means may be liquid crystal lens having annular concentric electrodes located on its substrates. Voltages are applied to the lens electrodes during operation of the display arrangement, to present static regions of different liquid crystal director orientations either parallel to or perpendicular to the surfaces of the substrate. The polarisation of incident light may be switched between one mode in which the refractive index of the lens appears uniform and a second mode in which it is different at the electrode regions compared to the non-electrode regions. The polarisation may be rapidly changed so as to effect a change in the focal properties of the lens, and hence the appearance of the display assembly. In another embodiment of the invention, the lens means may comprise a holographic plate, for example.

BRIEF DESCRIPTION OF THE DRAWINGS

Some ways in which the invention may be performed are now described by way of example with reference to the accompanying drawings in which.

DESCRIPTION OF PREFERRED EMBODIMENTS

Figure 1:
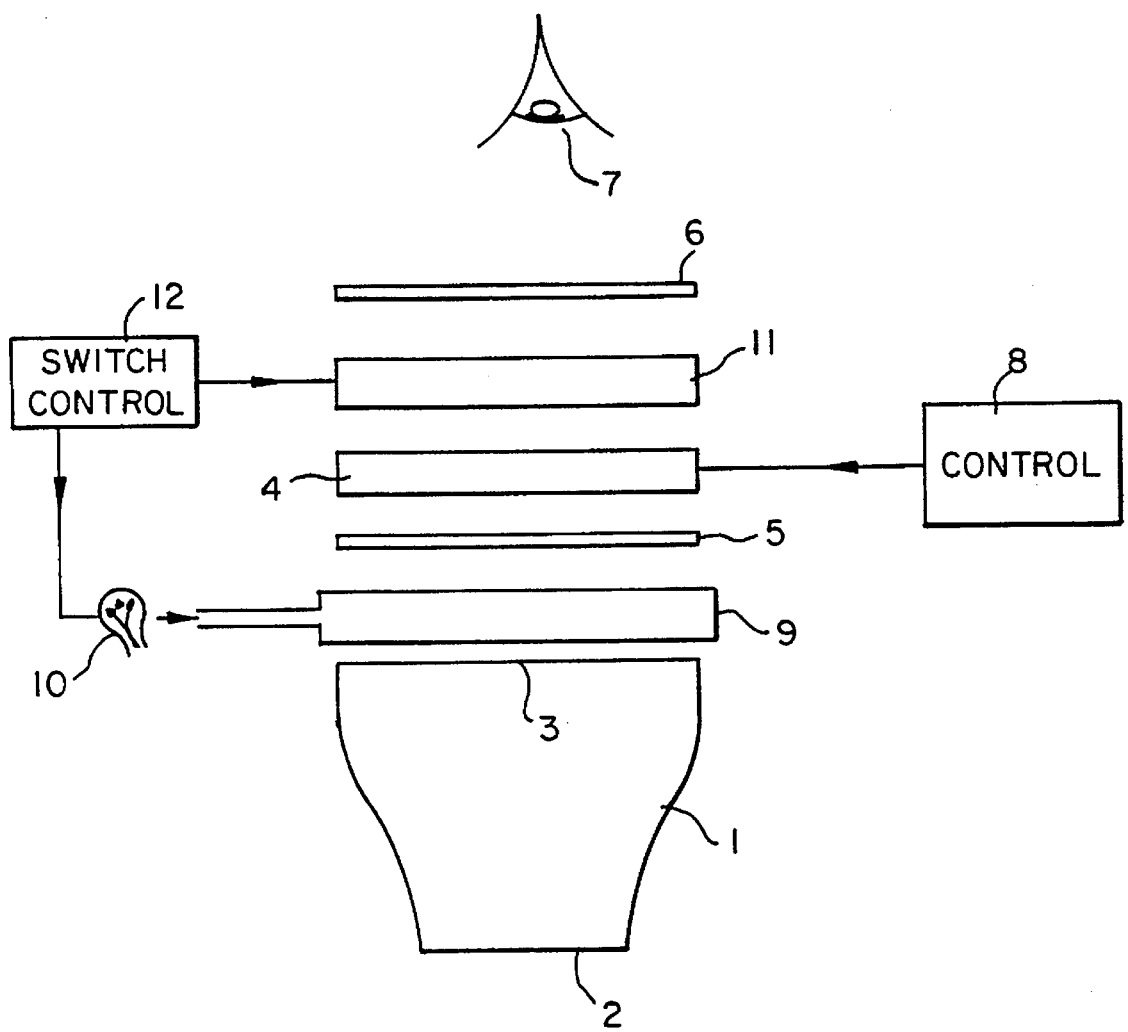
FIG. 1 schematically represents a display arrangement in accordance with the invention.

With reference to FIG. 1, an image intensifier tube 1 incorporated in a pilot's goggles includes an input face 2 on which radiation from a viewed scene is incident. The output face 3 of the intensifier tube 1 presents a viewed scene to an observer.

The arrangement also includes a supertwist liquid crystal display (LCD) 4 located between two polarisers 5 and 6. These components of the arrangement are located in the optical path between the output face 3 of the tube 1 and the viewer shown schematically at 7. Display circuitry 8 is arranged to produce the required moving or static symbology on the LCD 4 by applying select and non-select voltages to appropriate pixels in a conventional manner. The arrangement further comprises a light guide 9 located between the output face 3 of the tube 1 and the first polariser 5. The light guide 9 is optically transmissive and has roughened surfaces such that light transmitted into it from a source 10 is directed towards the polariser 5 and LCD 4 to provide backlighting to the latter.

A ferroelectric liquid crystal shutter 11 is located between the LCD 4 and the second polariser 6. This acts as a switchable n/2 optical retarder. In one state, the shutter 11 permits optical radiation to be transmitted therethrough without modification of its polarisation. When the other state of the shutter 11 is selected, the polarisation of light passing through it is rotated by approximately 90°. By switching the shutter 11, therefore, the LCD 2 switches between first and second modes. In the first mode it operates in a "yellow mode" in which it is substantially transmissive to incident optical radiation except for those pixels which are addressed to provide symbology. In the second mode, the LCD 4 operates as a "blue mode" display in which it exhibits a dark background which absorbs light emitted from the image intensifier output 3 and the illuminant from the light guide 9. The light source 10 is controlled such that it only emits when the LCD 4 is in the second state. In this mode, symbology appears as lighter than the background as the selected pixels transmit light from the pulsed illuminant and from the first display provided by the image intensifier tube 1. Thus, the arrangement comprises two sub-frames in which the first comprises an image from the first display overlaid with dark symbology and the second is an image of the symbology illuminated by the pulsed light source 10 on a dark background. If the light source 10 is a light emitting diode then it is possible to drive both the ferroelectric liquid crystal shutter 11 and source 10 from the same electronics 12.

It is possible to switch the shutter between its first and second states in typically 100 to 200 microseconds. Therefore, it is readily possible by switching the ferroelectric liquid crystal shutter 11, say, every 10 ms to merge the two images. The viewer thus perceives he scene overlaid with clearly visible symbology. The long response time, typically from 80 to 150 ms of the supertwist LCD 4 is therefore unimportant in providing the overlaid display.

In another embodiment of the invention, which is not illustrated, the ferroelectric liquid crystal shutter is located between the first polariser and the LCD, being positioned in front of the latter in the optical path.

Figure 2:
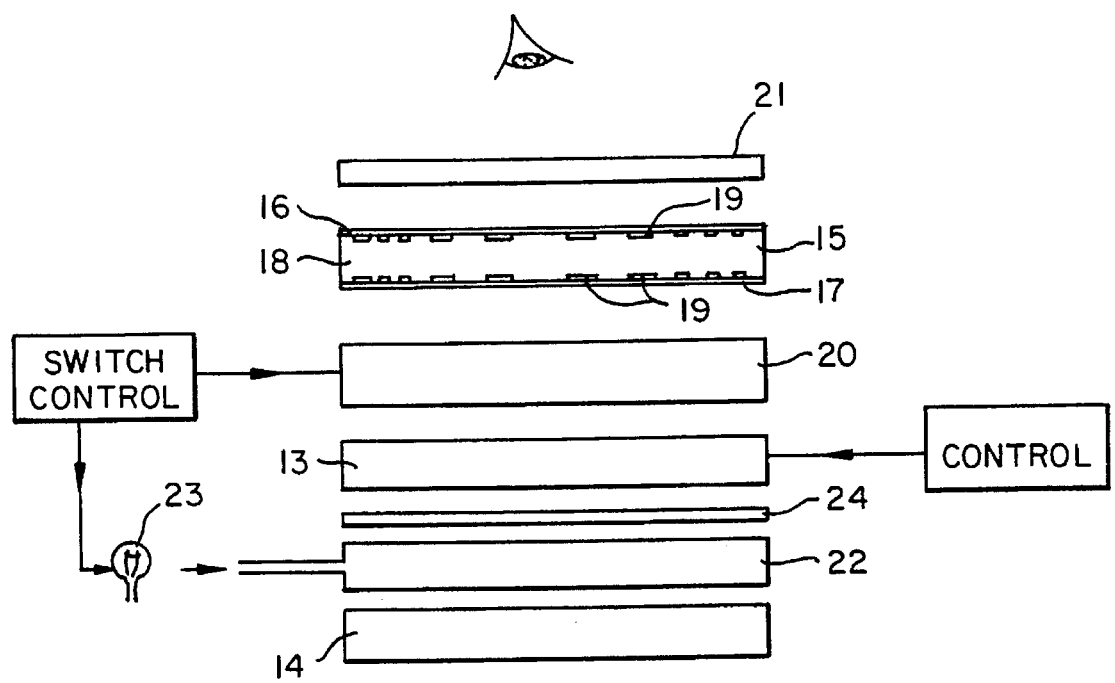
FIG. 2 schematically illustrates another display arrangement in accordance with the invention.

With reference to FIG. 2, in another embodiment in accordance with the invention, a display arrangement comprises a first liquid crystal display 13 and a second display 14 located behind it. The display arrangement also includes a liquid crystal lens 15 which comprises two substrates 16 and 17 having liquid crystal material 18 located between them. The substrates 16 and 17 bear a pattern of concentric annular electrodes 19 on their inner surfaces. The spacing between the electrodes is approximately 10 microns at the inner part of the pattern and decreases gradually in steps to an outer spacing of approximately 3 microns. The widths of the conductive regions decrease in an outward direction in a similar manner. The arrangement also includes a ferroelectric liquid crystal shutter 20 located behind the lens 15 and an exit polariser 21. A light guide 22 is located behind the first display 13 and is arranged to receive light from a source 23, which may be an LED for example. Another polariser 24 is located between light guide 22 and the first display 13.

During operation of the arrangement, the lens 15 is kept in a static operative state in which electric fields are maintained between facing regions of the electrodes 16 and 17. The long axes of the liquid crystal molecules are aligned so that they are parallel to the substrate surfaces in the non-electrode regions and perpendicular to them in the regions between the facing electrodes.

The ferroelectric liquid crystal shutter 20 is operated so as to switch the polarisation of light incident on the lens 15 between a first state in which it is essentially perpendicular to the orientation of the liquid crystal director in the non-electrode region to a second state in which it is essentially parallel to the liquid crystal director in the non-electrode regions. In the first state, both the on and off regions of the lens present the same refractive index to light transmitted therethrough and the lens appears optically clear with no focusing. The second display is thus viewed by an observer. In the second state, there are difference refractive indices between the electrode and non-electrode regions of the lens. This brings into focus the first display 13 for viewing by an observer. By switching the ferroelectric shutter 20 between the two polarisation states, the first display 13 comes into and out of focus to present an image which is overlaid on the second display 14. The light source 23 is switched in synchronism with the shutter 20 such that it is illuminated during viewing of the first display 13 such that the display symbology is clearly seen. The second display 14 may be an LCD device or a viewed scene.

Figure 3:
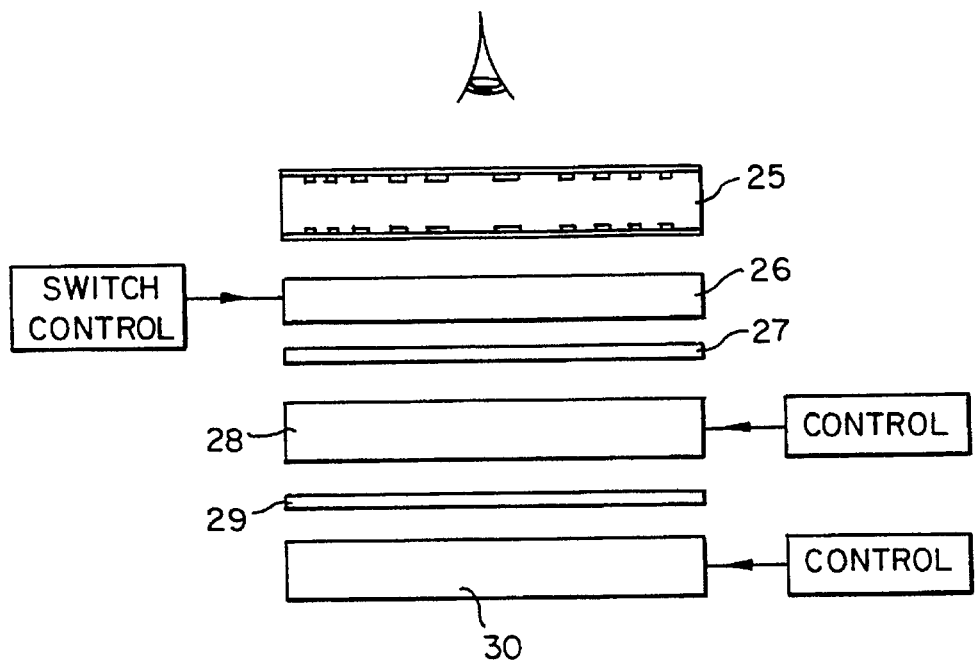
FIG. 3 schematically illustrates a further display arrangement in accordance with the invention.

In the arrangement of FIG. 2, the first display switches between one state in which the symbology appears as light on a dark background and a second reverse state. FIG. 3 illustrates another arrangement in which switching between different modes of the display assembly is carried out using a polarisation dependent lens but in which the appearance of the first display remains unchanged. It comprises a lens 25 similar to that of FIG. 2 behind which is located, in order, a ferroelectric shutter 26 for changing the polarisation, a polariser 27, a first display 28 on which symbology is presented, a second polariser 29 and a second display 30, which in this case is an LCD device. By controlling the shutter 26 the two displays come into focus alternately.

The arrangements of the Figures are shown in exploded view for clarity but in practice it is preferred that the elements are located closely adjacent to one another.

I claim:

1. A display arrangement comprising: a display assembly having different display modes and including a first liquid crystal display and a second display, and means for switching the polarization of light transmitted through said means between first and second states whereby the display mode of said assembly is changed such that said first display appears to be overlaid on said second display to a viewer, said first liquid crystal display, said second display and said means being spatially distributed along an optical path through said arrangement.

2. An arrangement as claimed in claim 1 wherein said second display is a viewed scene presented at an input of the arrangement.

3. An arrangement as claimed in claim 2 including means for presenting a viewed scene as said second display at said input of the arrangement such that said first display appears overlaid on said scene to a viewer.

4. An arrangement as claimed in claim 3 wherein said means for presenting a viewed scene includes an image intensifier tube.

5. An arrangement as claimed in claim 1 including means for addressing said first display to produce an image on a background and wherein said means for changing the polarization is switchable between two states such that said display assembly switches between a first display mode in which the background of said first display is substantially optically transmissive and a second display mode in which it is substantially optically absorbing.

6. An arrangement as claimed in claim 5 wherein said second display is a viewed scene presented at an input of the arrangement.

7. An arrangement as claimed in claim 1 wherein said means for switching the polarization comprises a ferroelectric liquid crystal cell.

8. An arrangement as claimed in claim 1 wherein said means for changing the polarisation switched between two polarised states in under 2 milliseconds.

9. An arrangement as claimed in claim 1 wherein the first liquid crystal display comprises a supertwist liquid crystal cell.

10. An arrangement as claimed in claim 1 including an optical source for illuminating said first liquid crystal display.

11. An arrangement as claimed in claim 10 including means for controlling the source such that it is illuminated for one display mode made and not for another display mode.

12. An arrangement as claimed in claim 10 including a light guide for conducting optical radiation to backlight said first liquid crystal display.

13. An arrangement as claimed in claim 1 including means for displaying symbolic information on said first display.

14. A display arrangement comprising: a display device including a liquid crystal display located between two polarisers; means located between said liquid crystal display and one of said two polarisers for controlling the polarisation of light transmitted through said means such that by switching said means between two states, said device switches between a first mode in which the background of said display is substantially optically transmissive and a second mode in which it is substantially optically absorbing: and means for presenting a viewed scene at an input of said display device such that said liquid crystal display appears overlaid on the scene to a viewer.

15. An arrangement as claimed in claim 1 wherein said display assembly includes lens means having focal characteristics which are dependent on the polarisation of light incident thereon said lens means being located on the viewing side of said means for changing the polarisation.

16. An arrangement as claimed in claim 15 wherein said lens means is a liquid crystal device.

17. An arrangement as claimed in claim 15 wherein said means for controlling the polarisation comprises a ferroelectric liquid crystal cell.

18. An arrangement as claimed in claim 15 wherein said means for controlling the polarisation switches between two polarised states in under 2 milliseconds.

19. An arrangement as claimed in claim 15 wherein said first liquid crystal display comprises a supertwist liquid crystal cell.

20. An arrangement as claimed in claim 15 including an optical source for illuminating said first liquid crystal display.

21. An arrangement as claimed in claim 20 including means for controlling said optical source such that it is only illuminated for one display mode and not for another display mode.

22. An arrangement as claimed in claim 20 including a light guide for conducting optical radiation to backlight said first liquid crystal display.

23. An arrangement as claimed in claim 15 wherein in one display mode the background of said first display is substantially optically transmissive and in another display mode it is substantially optically absorbing.

24. An arrangement as claimed in claim 15 including means for displaying symbolic information on said first display.

\* \* \* \* \*